US005186043A

United States Patent [19]

Yamaoka et al.

[11] Patent Number: 5,186,043

[45] Date of Patent: Feb. 16, 1993

[54] LOAD SENSOR

[75] Inventors: Fumiyuki Yamaoka; Shinobu Kakizaki, both of Kanagawa, Japan

[73] Assignee: Atsugi Unisia Corporation, Atsuji, Japan

[21] Appl. No.: 706,275

[22] Filed: May 28, 1991

[30] Foreign Application Priority Data

May 28, 1990 [JP] Japan .................................. 2-137367

[51] Int. Cl.[5] .............................................. G01M 19/00

[52] U.S. Cl. ................................ 73/118.1; 73/862.041

[58] Field of Search ........................... 73/118.1, 862.04; 280/707

[56] References Cited

U.S. PATENT DOCUMENTS

| | | | |
|---|---|---|---|
| 4,800,751 | 1/1989 | Kobayashi et al. | 73/118.1 |
| 4,911,023 | 3/1990 | Izumi et al. | 73/862.04 |

FOREIGN PATENT DOCUMENTS

| | | | |
|---|---|---|---|
| 218458 | 2/1985 | German Democratic Rep. | 73/862.04 |
| 61-91415 | 6/1986 | Japan . | |
| 215837 | 9/1987 | Japan | 73/862.04 |

*Primary Examiner*—Jerry W. Myracle

*Attorney, Agent, or Firm*—Bachman & LaPointe

[57] ABSTRACT

An elastically deflectable sensor body has an inner peripheral portion engaging with a first portion of a radially extending wall of a lid closing one end of a cylinder of a shock absorber for movement therewith and an outer peripheral portion engaging with a second portion of the radially extending wall. A first pair of diametrically opposed strain gages and a second pair of diametrically opposed strain gages are placed on the sensor body. A first Wheatstone bridge circuit has the two diametrically opposed strain gages of the first pair in series. A second Wheatstone bridge circuit has the two diametrically opposed strain gages of the second pair in parallel.

5 Claims, 3 Drawing Sheets

3 3a 14c 2 4 2a 90 9 91a 91b 14b 14 92 14a 12 1

LOAD SENSOR

RELATED APPLICATION

U.S. patent application Ser. No. 07/661,007 filed on Feb. 26, 1991 by Fumiyuki YAMAOKA et al.:

This U.S. patent application corresponds to United Kingrom Patent Application No. 9104230.9 and German Patent Application No. P4106442.9.

BACKGROUND OF THE INVENTION

The present invention relates to an apparatus for detecting an input load applied to a suspension member of a vehicle.

Japanese Utility Model First (unexamined) Publication No. 61-91415 discloses an apparatus for detecting an input load using a piezoelectric element. This known detecting apparatus tends to generate an incorrect output signal upon application of a radial load.

An object of the present invention is to provide an apparatus which can detect a radial component of an input load as well as an axial component thereof.

SUMMARY OF THE INVENTION

According to the present invention, there is provided an apparatus for detecting an input load, comprising:

a member including a radially extending wall which is adapted to elastically deform upon being subject to an input load, the radially extending wall having a first portion and a second portion spaced from said first portion;

an elastically deflectable sensor body having an inner peripheral portion engaging with said first portion for movement therewith and an outer peripheral portion engaging with said second portion for movement therewith;

a first pair of diametrically opposed sensing elements on said sensor body;

a second pair of diametrically opposed sensing elements on said sensor body;

a first bridge circuit having said two diametrically opposed sensing elements of said first pair in series; and a second bridge circuit having said two diametrically opposed sensing elements of said second pair in parallel.

DETAILED DESCRIPTION OF THE INVENTION

Figure 1:
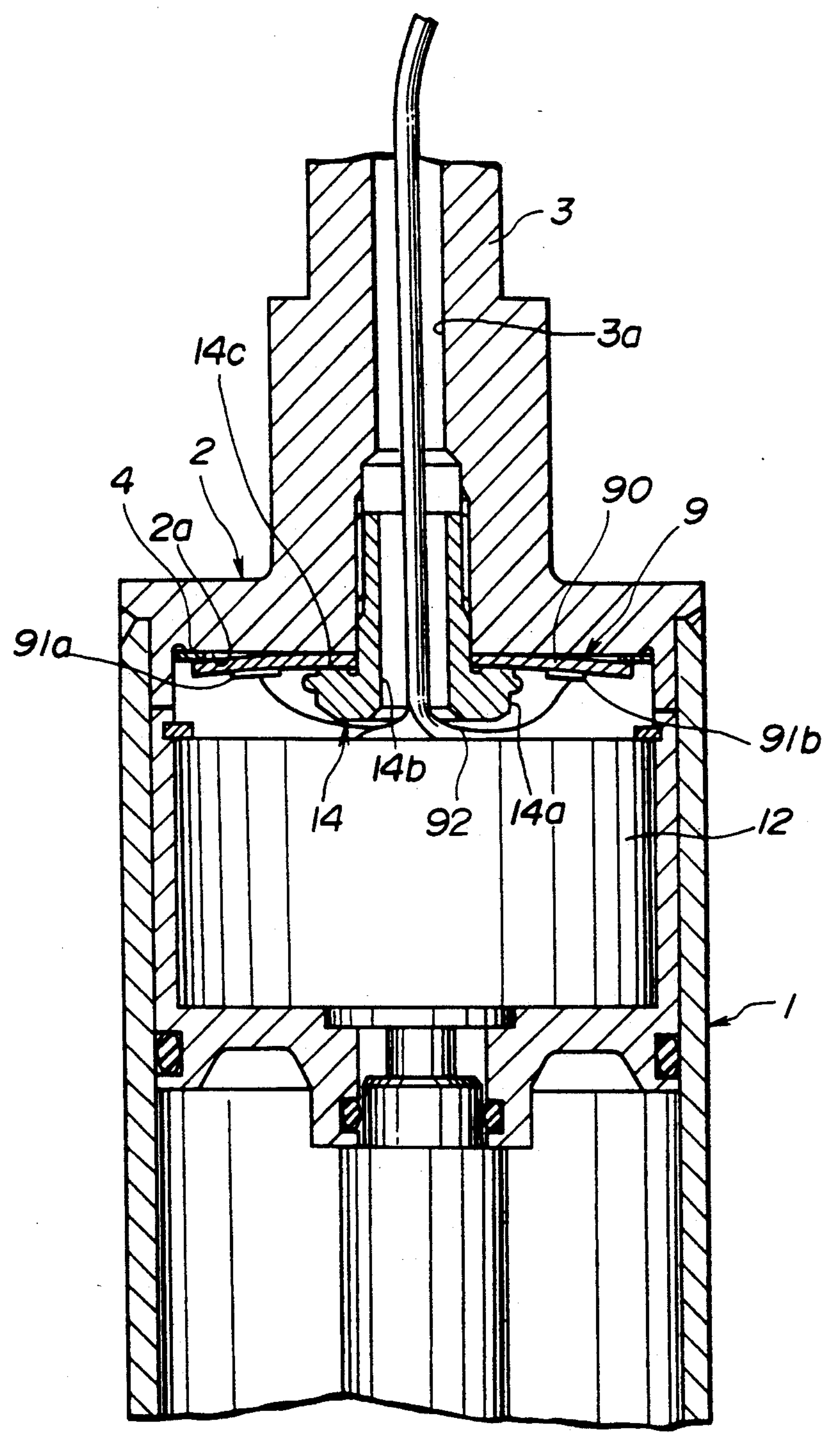
FIG. 1 is an enlarged fragmentary view of a hydraulic shock absorber.

The present invention is further described in connection with the accompanying drawings. FIG. 1 shows a portion of a hydraulic shock absorber including a fluid filled cylinder 1. Mounted within the cylinder 1 is an actuator 12 for actuating a variable flow restrictor, not illustrated. The variable flow restrictor defines a restricted flow passage which a damping fluid passes through between a first portion of the cylinder 1 and a second portion thereof across a piston, not illustrated, slidably disposed in the cylinder 1.

The cylinder 1 has an upper end, viewing in FIG. 1, closed by a lid 2 with an integral mounting rod 3. The mounting rod 3 has an upper end portion, viewing in FIG. 1, connected to a body of an automobile, not illustrated, via a mount insulator. The mounting rod 3 is formed with an axial through bore 3*a*. The lid 2 has a radially extending wall 2*a* defining the upper end of the cylinder 1, and the axial through bore 3*a* has one end terminating at a circular opening within this radially extending wall 2*a*. The axial through bore 3*a* is tapped at a portion adjacent this circular opening to receive a bolt 14 including a radially extending head 4*a* and formed with an axial bore 14*b* in axial alignment with the bore 3*a*. The head 14*a* has a radially extending annular wall 14*c* opposed to and in spaced relationship with the radially extending wall 2*a*.

Diposed between the two radially extending walls 2*a* and 14*c* is a sensor body 90. The sensor body 90 is of a plate having a central opening 90*a* defined by an inner periphery of a continuous ring 90*b*. The inner peripheral portion of the ring 90*b* is inserted between the radially extending walls 2*a* and 14*c*. A force with which the ring 90*b* of the sensor body 90 is pressed against the radially extending wall 2*a* is controllable by turning the bolt 14.

Figure 2:
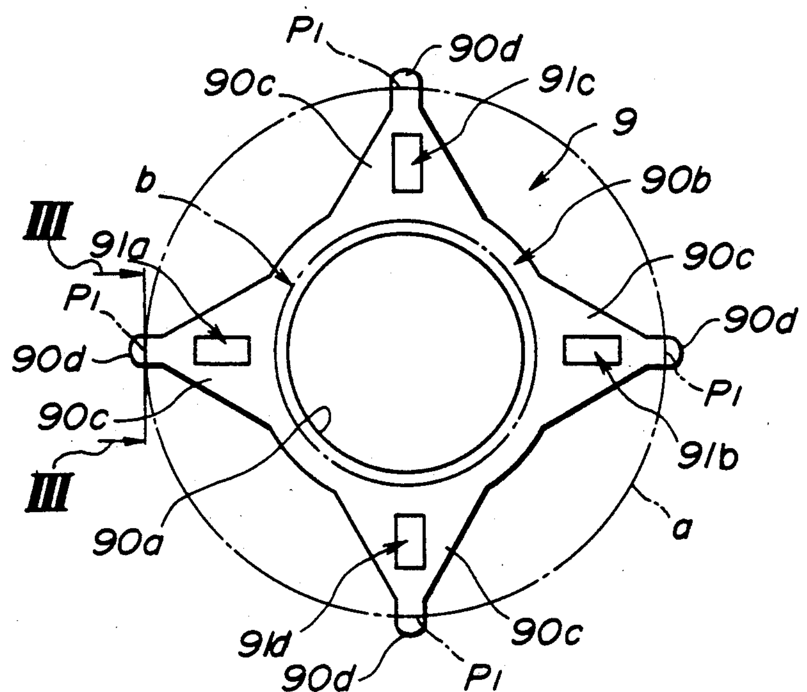
FIG. 2 is a bottom elevation of a sensor body.
Figure 3:
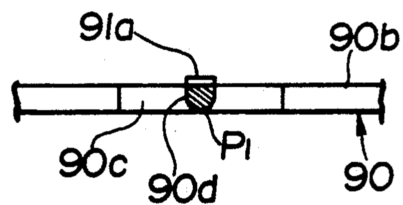
FIG. 3 is an enlarged section through the line III—III of FIG. 2.

FIG. 2 is a bottom elevation of the sensor 9. As best seen in FIG. 2, the sensor body 90 includes two pairs of radially extending tapered portions 90*c* extending radially outwardly from the ring 90*b*. The two radially extending tapered portions 90*c* of each pair are diametrically opposed to each other and all of the radially extending tapered portions 90*c* are angularly spaced equidistant. Each of the tapered end 90*d* is rounded, as shown in FIG. 3, to form a pivot Pl. Four strain gages 91*a*, 91*b*, 91*c*, and 91*d* are placed on the radially extending tapered portions 90*c* on the side remote from the radially extending wall 2*a* (see FIG. 1). Each of the strain gages 91*a*, 91*b*, 91*c*, and 91*d* is located at a center of the corresponding one of the radially extending tapered portions 90*c*. In FIG. 2, a phantom line drawn inner circle b indicates a portion at which the sensor body 90 is supported between the radially extending walls 2*a* and 14*c*, while a phatom line drawn outer circle a interconnects the four pivots P1. These circles a and b are coaxial.

Returning back to FIG. 1, a washer 4 is interposed between the radially extending wall 2*a* and the pivots P1, deflecting the radially extending tapered portions 90*c* away from the radially extending wall 2*a*. In this initial state of the load sensor 9, each of the strain gages 91*a*, 91*b*, 91*c* and 91*d* is subject to an initial compression stress. The degree of this compression stress is reduced as an input load applied to the lid 2 from the axle assembly increases.

Detailed description of the strain gages is omitted since the strain gages are well known. Lead lines, only one being denoted by the reference numeral 92, are connected to the strain gages 91*a*, 91*b*, 91*c* and 91*d* and extend upwardly through the bores 14*b* and 3*a*. Lead lines connecting to the actuator 12 also extend upwardly through the bores 14*b* and 3*a*.

Figure 4:
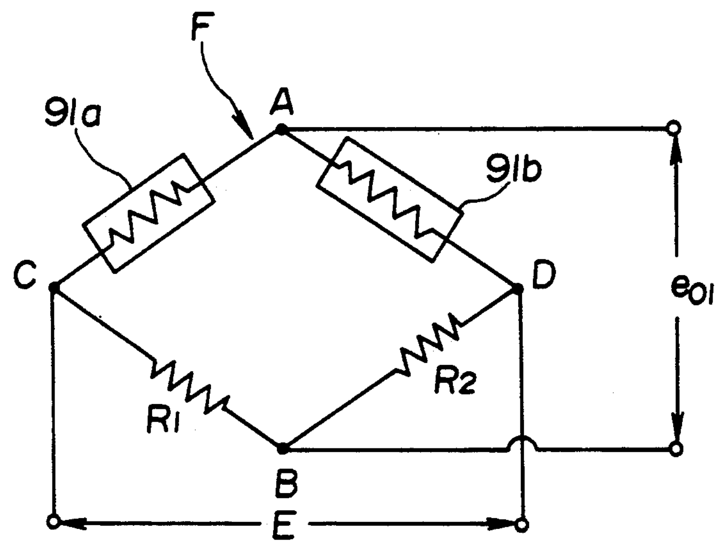
FIG. 4 is a circuit diagram for detecting a radial component of an input load.

As readily understood from FIG. 2, the two strain gages 91*a* and 91*b* form the first pair and the other two strain gages 91*c* and 91*d* the second pair. FIG. 4 shows a bending moment detecting circuit F wherein the two stain gages 91*a* and 91*b* of the first pair and two reference resistors $R_1$ and $R_2$ form a Wheatstone bridge. The strain gages 91$a$ and 91$b$ are connected in parallel with respect to two output terminals A and B. With this arrangement of the two strain gages 91$a$ and 91$b$, application of the axial load to the sensor body 90 does not cause any change in an output potential $e_{01}$ since the degree and direction of deflection of the strain gages 91$a$ and 91$b$ are the same and no difference between their resistances occur. In FIG. 4, the reference character E denotes an input potential applied across two input terminals C and D. Upon application of a radial input load, i.e., a bending stress, the degree of compression stress of one of the strain gages 91$a$ and 91$b$ increases, while the degree of compression stress of the other strain gage decreases, and thus there occurs a difference between resistances of the strain gages 91$a$ and 91$b$. As a result the output ponential $e_{01}$ changes. Thus, the circuit F can detect a radial load only.

Figure 5:
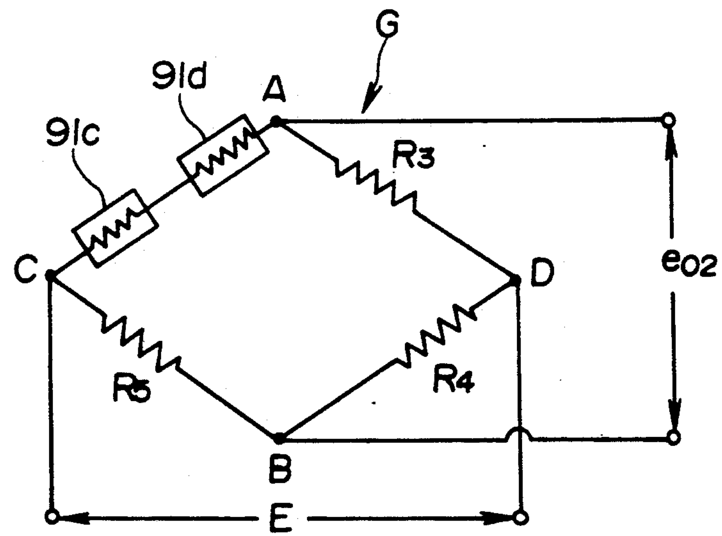
FIG. 5 is a circuit diagram for detecting an axial component of the input load.

The other two strain gages 91$c$ and 91$d$ of the second pair and three reference resistors $R_3$, $R_4$ and $R_5$ form a Wheatstone bridge of an axial load detecting circuit G as shown in FIG. 5. Referring to FIG. 5, the strain gages 91$c$ and 91$d$ are connected in series with respect two output terminals A and B so that an axial load only is detected since effects on the strain gages 91$c$ and 91$d$ by application of a raidial load are offset and no difference in output potential $e_{02}$ occurs.

From the preceding description, it will now be appreciated with a single sensor body with a plurality of strain gages thereon, a radial component of an input load as well as an axial component thereof are detected.

What is claimed is:

1. An apparatus for detecting an input load, comprising:

- a shock absorber including a cylinder and a lid closing one axial end of said cylinder;
- a lid including a radially extending wall which is adapted to elastically deform upon being subject to an input load, the radially extending wall having a first portion and a second portion spaced from said first portion;
- an elastically deflectable sensor body having an inner peripheral portion engaging with said first portion for movement therewith and an outer peripheral portion engaging with said second portion for movement therewith;
- a first pair of diametrically opposed sensing elements on said sensor body;
- a second pair of diametrically opposed sensing elements on said sensor body;
- a first bridge circuit having said two diametrically opposed sensing elements of said first pair in series; and
- a second bridge circuit having said two diametrically opposed sensing elements of said second pair in parallel.

2. An apparatus as claimed in claim 1, wherein said sensor body is of a plate including a ring defining a central opening and two pairs of radially extending taperted portions.

3. An apparatus as claimed in claim 2, wherein said sensing elements are strain gages which are placed on said radially extending tapered portions, respectively.

4. An apparatus as claimed in claim 1, wherein said first and second bridge circuits are Wheatstone bridges, respectively.

5. An apparatus for detecting an input load, comprising:

- a member including a radially extending wall which is adapted to elastically deform upon being subject to an input load, the radially extending wall having a first portion and a second portion spaced from said first portion wherein said member is a lid closing one axial end of a cylinder of a shock absorber;
- an elastically deflectable sensor body having an inner peripheral portion engaging with said first portion for movement therewith and an outer peripheral portion engaging with said second portion for movement therewith;
- a first pair of diametrically opposed sensing elements on said sensor body;
- a second pair of diametrically opposed sensing elements on said sensor body;
- a first bridge circuit having said two diametrically opposed sensing elements of said first pair in series; and
- a second bridge circuit having said two diametrically opposed sensing elements of said second pair in parallel.

* * * * *